Sept. 19, 1967  J. C. DIEPEVEEN  3,342,395

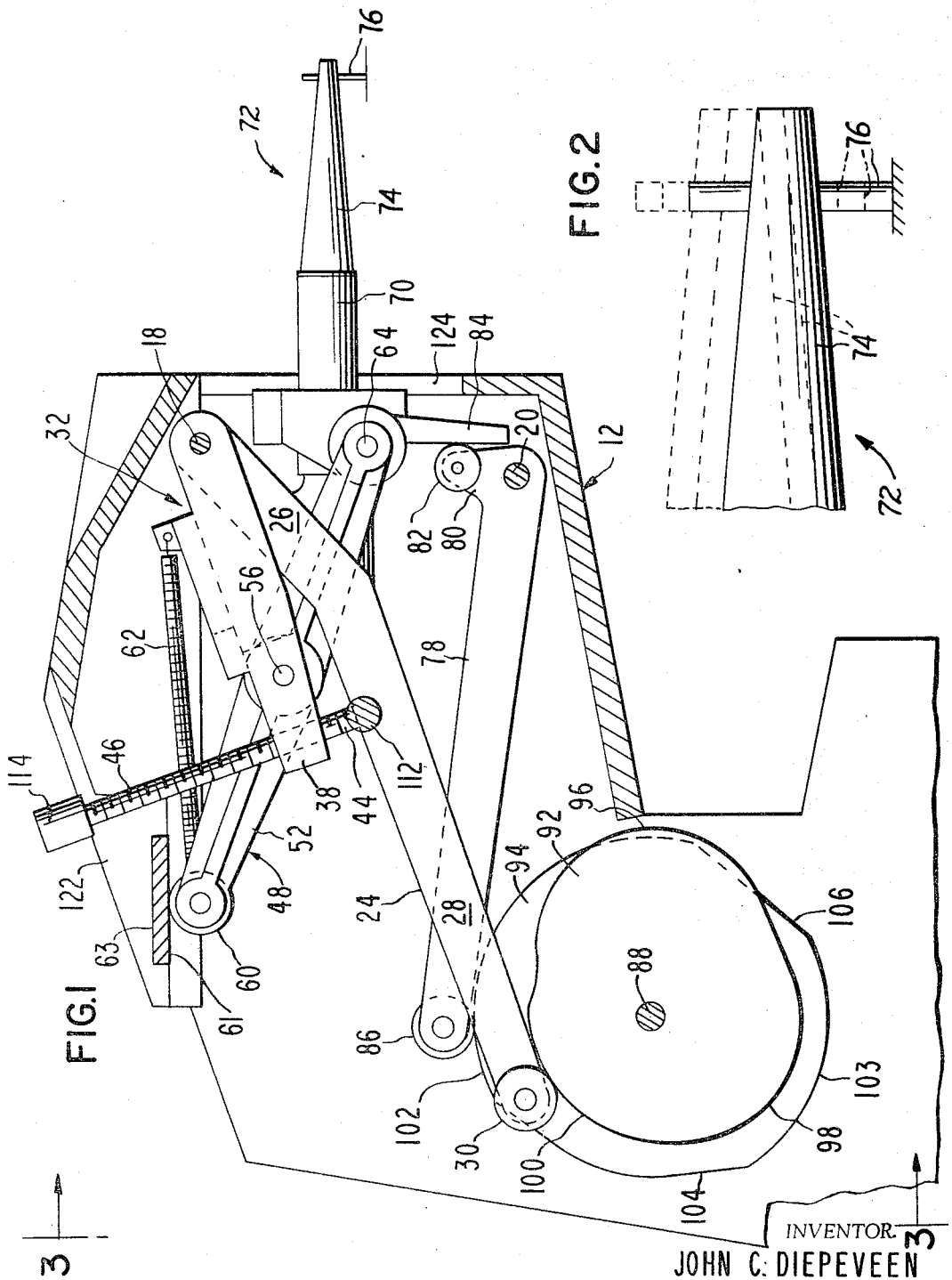

PRECISION DRIVE APPARATUS FOR A TOOL MOUNT

Filed Oct. 10, 1966  3 Sheets-Sheet 2

INVENTOR.
JOHN C. DIEPEVEEN
BY Townsend and Townsend
ATTORNEYS

Sept. 19, 1967 J. C. DIEPEVEEN 3,342,395
PRECISION DRIVE APPARATUS FOR A TOOL MOUNT
Filed Oct. 10, 1966 3 Sheets-Sheet 3

INVENTOR.
JOHN C. DIEPEVEEN
BY *Townsend and Townsend*
ATTORNEYS

United States Patent Office 3,342,395
Patented Sept. 19, 1967

3,342,395
PRECISION DRIVE APPARATUS FOR A TOOL MOUNT
John C. Diepeveen, Sunnyvale, Calif., assignor to Unitek Corporation, Monrovia, Calif., a corporation of California
Filed Oct. 10, 1966, Ser. No. 585,366
15 Claims. (Cl. 228—1)

This invention relates to precision control of a movable tool, and, more particularly, to apparatus for moving a tool mount along a predetermined path.

The present invention resides in apparatus for shifting a tool mount with precision in opposite directions along a straight line path of relatively short length. The apparatus uses rotatable components assembled in a manner to transform the rotational movement of the components into rectilinear movement of the tool mount. To this end, an elongated actuating member is pivotally mounted midway between its ends on a rotatable control member. The tool mount is connected to one end of the actuating member while the opposite end of the latter is shiftable back and forth along an abutment disposed perpendicularly to the desired path of the tool mount. By rotating the control member, the actuating member is caused to pivot with respect to the control member while the opposite end of the actuating member shifts in a straight line along the abutment. This movement causes the end connected to the tool mount to move along a straight line path and to shift the tool mount accordingly.

Cam means is coupled with the control member for rotating the same. Thus, the movement of the tool mount can be accomplished according to a predetermined timed sequence since the cam means may be actuated by a timing motor or similar structure.

An important aspect of the invention is the way in which the movement of the tool mount can be changed by merely manipulating adjustment devices forming a part of the drive apparatus. These devices allow not only for a change in the length of the path but also in the path is traversed. Thus, the tool mount can be made to move between the ends of the path and also so start from and stop at locations intermediate the path ends. In this way, the tool itself can be positioned to perform different functions depending on its location relative to the path ends.

While this invention is adapted for a number of different uses, it is especially suitable for use in bonding components of relatively small dimensions, and where a bonding tool must be accurately positioned with respect to the components to be bonded. For example, the invention can be used as a part of an ultrasonic bonding machine of the type used to connect wires of extremely small dimensions to respective contact points of a semiconductor wafer or chip.

Ultrasonic energy has been used in the past for bonding wires to electronic circuit components. A conventional machine of this type generally has its tool mount positioned for rotation into and out of an operative disposition relative to a wire or other component to be bonded. Since the dimensions of these components are quite small, it is important that the tool be properly positioned before sonic energy is imparted to the components. Otherwise, the energy will not be properly distributed and could be concentrated at discrete locations, resulting in structurally weakening one or both of the components to be bonded together. This is a condition which is to be avoided especially if bonded components form parts of an assembly which is to be subjected to environmental stresses, such as high accelerations of the like.

If a tool mount is rotated into position, there is only one proper operative position therefor, namely the position at the outermost location on its arcuate path of travel. It is at this location that the tool should engage one of the components to be bonded since, at any other location, the tool will not be in proper contact with this component. Also, the tool is generally called upon to provide a force to press the two components together as the same are being bonded. If the tool is off center in this respect, it will not provide the requisite pressure. Moreover, the pressure that is applied may possibly cause structural weakening of the component contacted thereby in view of the small dimensions of the component.

The present invention, when used as a part of a bonding machine of the type described, assures that the bonding tool will be in the proper operative position to effect maximum energy transfer while providing the proper pressure to hold the components together during the bonding operation.

To this end, the mount to which the tool is coupled is made to reciprocate along a vertical path to avoid the defects arising from moving the tool into position along an arcuate path as mentioned above. The straight line movement is accomplished by the use of a lever and cam assembly not only to simplify the overall construction but also to permit the apparatus to be confined in a limited region to minimize space requirements. Moreover, the use of cams allows the sequencing of the movement so that the tool can be positioned at certain locations according to a timed relationship. The cam and lever assembly also allows for making one cam and lever unit operative while making another set inoperative. By means of this feature, changes can be made in the way in which the tool traverses its path of travel.

The primary object of the invention is to provide apparatus for reciprocating a tool mount along a straight line path in accordance with a predetermined timed sequence so that the apparatus is suitable for use in a bonding machine for moving a bonding tool toward and away from several operative locations relative to a workpiece.

Another object of the invention is to provide apparatus of the type described which uses rotatable drive components which are arranged to permit rotational movement to be transformed into straight line movement so that the tool mount, when coupled with certain of the drive components, will traverse the desired straight line path as the remaining components are caused to rotate.

Another object of the invention is to provide drive apparatus of the type described which has several sets of cams and levers capable of operating independently of each other and attached to be operably coupled to the tool mount, whereby the movement of the tool mount can be changed as desired by changing from one cam and lever set to another by the mere manipulation of adjustment screws placing the sets in operation, all of which can be accomplished without affecting the desired straight line feature of the path of the tool mount.

Yet another object of the present invention is to provide an improved ultrasonic bonding machine having a tool mount and drive apparatus of the type described for shifting the tool mount, whereby a tool connected to the mount will be caused to move in a straight line toward and away from an article to be bonded to thereby avoid the problems mentioned above with respect to the rotatable tool mounts of conventional bonding machines.

In the drawings:

FIG. 1 is a side elevational view of the drive apparatus coupled to a support;

FIG. 2 is an enlarged, fragmentary view of a tool and tool mount showing the way in which the same move in a straight line when the drive apparatus is operating;

Figure 3:
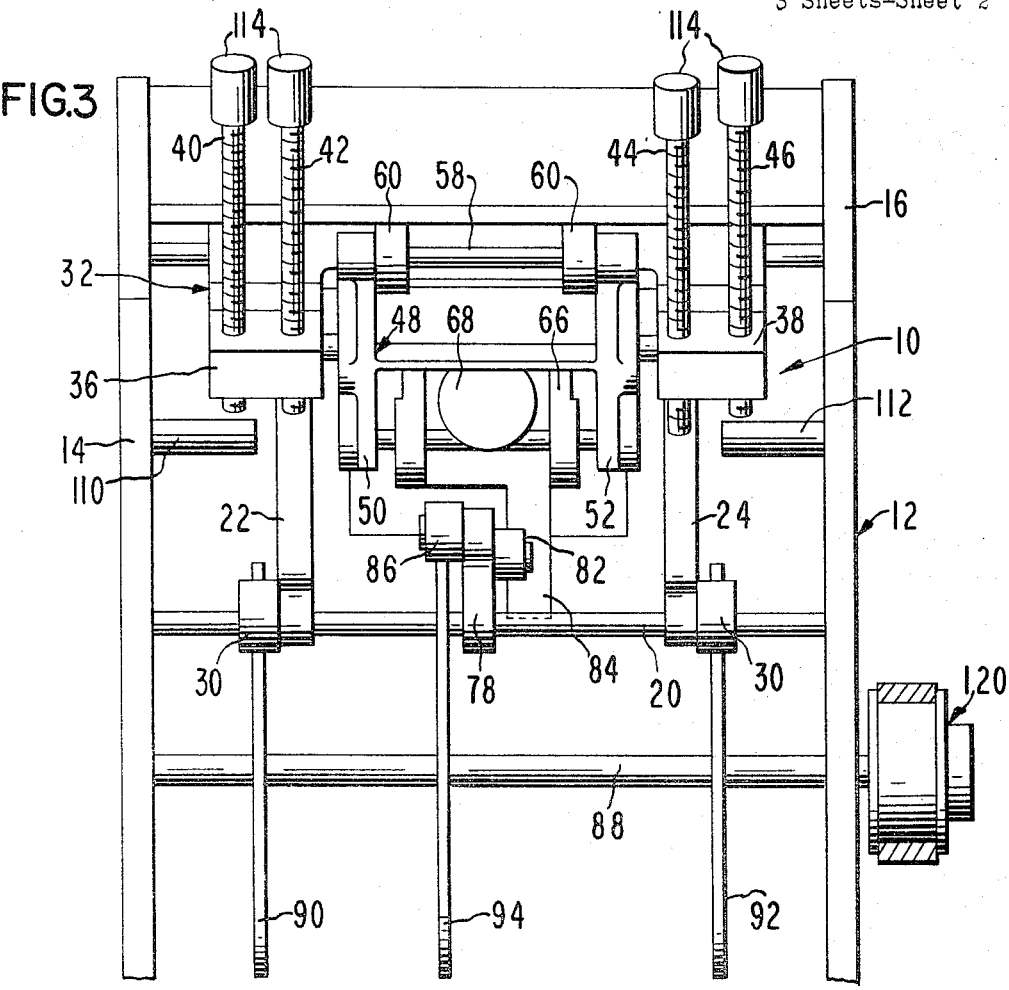
FIG. 3 is an end elevational view of the drive apparatus.

Drive apparatus 10, as shown in FIGS. 1 and 3, includes a support 12 having a pair of opposed side walls 14 and 16. A pair of spaced, generally horizontal shafts 18 and 20 extend between and are secured to side walls 14 and 16.

A pair of levers 22 and 24 (FIGS. 1, 3 and 5) are journaled at corresponding ends thereof on shaft 18. Each of these levers has a pair of angularly disposed sections 26 and 28 and a roller 30 on the outer end of section 28 for engaging a cam to be described.

An H-shaped control member 32 has a pair of spaced arms 34 journaled on shaft 18 for rotation relative to levers 22 and 24. Member 32 also has a pair of spaced legs 36 and 38 which partially overlie respective levers 22 and 24. Leg 36 has a pair of adjusting screws 40 and 42 and leg 38 has a pair of adjusting screws 44 and 46 extending therethrough.

Figure 5:
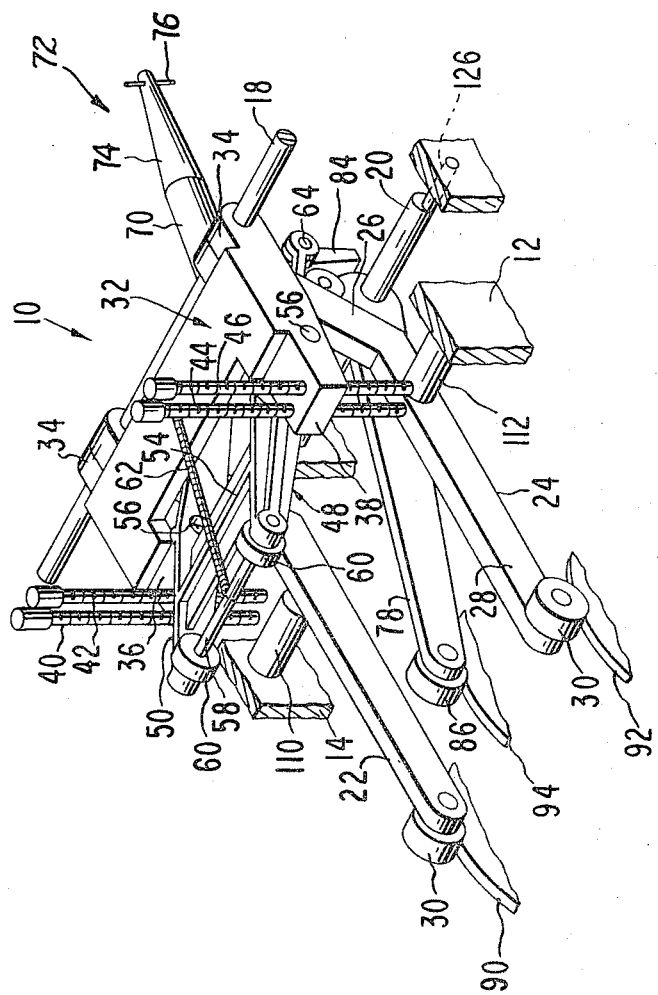
FIG. 5 is a perspective view of certain of the components of the apparatus.

An H-shaped actuating member 48 is disposed in an inclined position between and is pivotally mounted on legs 36 and 38 as shown in FIGS. 1 and 5. Member 48 has a pair of sides 50 and 52 which are interconnected by a web 54 and each of the sides 50 and 52 has a bearing 56 midway between its ends for coupling the side to the adjacent leg of member 32. Thus, side 50 is journaled in leg 36 and side 52 is journaled in leg 38. A shaft 58 interconnects the upper ends of sides 50 and 52 and has a pair of spaced rollers 60 mounted thereon for rotation relative to member 48. Rollers 60 engage the lower face 61 of a flat, horizontally disposed plate 63 secured to support 12. A coil spring 62 interconnects shaft 58 and member 32 so that member 48 is biased against face 61.

The opposite or lower ends of sides 50 and 52 have a shaft 64 coupled therewith and a collar 66 is journaled by bearings (not shown) on shaft 64. Collar 66 has central opening 68 therethrough for receiving the cylindrical portion 70 of a tool mount 72 whose outer end portion 74 is conical as shown in FIGS. 1, 2 and 5. A tool 76 is mounted in portion 74 at its outer end in any suitable manner. Tool mount 72 is held within opening 68 by suitable locking means, such as a set screw or the like. Thus, mount 72 is rigid to collar 66 and moves therewith. By journaling collar 66 on shaft 64, the tool mount is allowed to rotate relative to member 48.

A third lever 78 journaled at one end to shaft 20 is disposed between levers 22 and 24 (FIG. 5). Lever 78 has a lateral extension 80 (FIG. 1) provided with a roller 82 which normally engages a leg 84 integral with and depending from collar 66 as shown in FIGS. 1 and 3. The opposite end of lever 78 has a roller 86 for engaging a cam to be described.

When lever 78 is in the position of FIG. 1, roller 82 engages leg 84 and provides an abutment therefor to prevent clockwise rotation of collar 66 on shaft 64. When lever 78 rotates in a counterclockwise sense viewing FIG. 1, roller 82 shifts in a direction away from leg 84. However, the weight distribution of the collar and tool mount unit is such as to cause leg 84 and thereby the collar to rotate in a clockwise sense when viewing FIG. 1. This feature is utilized to apply a force by means of tool 76 to a workpiece after the tool has been lowered into an operative position above and in engagement with the workpiece. The movement of the roller 82 essentially removes the abutment presented thereby so that the tool mount is, at least to a limited extent, free to pivot about shaft 64. In this way, the tool will apply a force equal to an increment of the weight of tool mount 72. This weight can be accurately adjusted by the use of an adjustable counterweight (not shown) coupled to collar 66 and extending in a direction away from the tool maunt.

A third shaft 88 is secured to and extends between side walls 14 and 16. A pair of cams 90 and 92 (FIG. 5) are mounted on shaft 88 for rocking levers 22 and 24 respectively about shaft 18. An intermediate cam 94 is mounted on shaft 88 for rocking lever 78 about shaft 20. Rollers 30 and 86 engage the outer peripheral edges of respective cams as shown in FIG. 5 and the weight distribution of respective levers maintains the rollers in these positions.

Cams 92 and 94 are shown in FIG. 1 and each has a distinctive configuration for performing the function of moving its respective lever. Although cam 90 is not shown, it has substantially the same configuration as cam 92 except that it is reversed on shaft 88.

Cam 92 has its three operating regions denoted by the numerals 96, 98 and 100. Each of these regions has an arcuate length and is at predetermined distance from the axis of rotation of the cam. Thus, three operating conditions will successively occur for each revolution of the cam.

Region 96 provides the zero or starting position of the cam. In this position, lever 24 is at its maximum distance from shaft 88. Corresponding to this, tool mount 72 will be in its highest position (FIG. 2). Cam 92 rotates in a counterclockwise sense when viewing FIG. 1 so that region 96 will move away from roller 30 of lever 24 as region 98 approaches it. Similarly, region 100 will approach this roller as region 98 moves away from it. The distance between shaft 88 and region 98 is greater than the corresponding distance between shaft 88 and region 100, but is less than the distance between shaft 88 and region 96. Region 98 provides an intermediate position for lever 24 and, correspondingly, tool mount 72 is at its middle or intermediate position. Region 100 provides the lowest position for lever 24 and tool mount 72 is accordingly at its lowest position. A smooth transition occurs between adjacent regions.

Cam 90 is disposed on a shaft 88 for rotation therewith. Thus, this cam rotates with cam 92. The difference between the cams on shaft 88 is that cam 90 moves in such a way that region 100 thereof immediately follows region 96, and region 98 follows region 100. Roller 30 of arm thererore moves from the maximum distance from shaft 88 to the minimum distance, then to an intermediate distance, and finally again to the maximum distance for each cycle of rotation of cam 90. Corresponding to this, tool mount 72 moves from its highest position, to its lowest position, then to its intermediate position, and finally to its highest position again.

Cam 94 has a pair of spaced, arcuate operative regions 102 and 103 and a pair of spaced, flat operating regions 104 and 106 which merge with regions 102 and 103 (FIG. 1). Regions 104 and 106 are closer to shaft 88 than are regions 102 and 103 to permit the counterclockwise swinging of lever 78 when viewing FIG. 1 when roller 86 moves from one of the arcuate regions to one of the flat regions. The purpose of this movement of lever 78, as set forth above, is to permit mount 72 to pivot downwardly and thereby cause tool 76 to apply a force to a workpiece engaged thereby. Regions 104 and 106 are positioned so as to effect this movement of lever 78 when levers 22 and 24 are in their operative dispositions defined by regions 98 and 100 of cams 90 and 92, respectively and when tool mount 72 is in its intermediate and lowest positions.

Side walls 14 and 16 have a pair of stub shafts 110 and 112, respectively, which project toward each other and partially underlie respective legs 36 and 38. Shafts 110 and 112 are adapted to be engaged by the ends of screws 40 and 46 in the manner shown in FIG. 3. Similarly, levers 22 and 24 are aligned with and are adapted to be engaged by screws 42 and 44, respectively. Tool mount 72 can be moved in either of two ways with the apparatus of this invention. These two ways are illustrated in FIG. 2 wherein the full line position of mount 72 represents its lowest position and the dashed line designations represent respectively its intermediate and highest positions. The highest position is the starting location and the mount can move either to the intermediate position, to the lowest position and reurn to the starting position or move from the starting position to the lowest position, to the intermediate position and then return to the starting position. These two ways of using the tool mount are determined by the settings of the adjustment screws 40, 42, 44 and 46.

For the first situation, i.e., the high—intermediate—low—high condition, screws 44 and 46 will be used while screws 40 and 42 will be inoperative. Screw 46 is moved until it bears against stub shaft 112 while screw 44 is moved until it bears against lever 24 (FIG. 3). Screw 46 will determine the lowermost position and the highest position of mount 72 while screw 44 will determine the intermediate position thereof.

These two screws are set before operation begins and all of the screws are provided with heads 114 to facilitate their adjustment. The adjusted positions of these screws relative to control member 32 also determines the length of the path traversed by tool mount 72. To obtain a relatively long path, the lower end of screw 46 is positioned a relatively short distance from the corresponding leg 38 and the lower end of screw 44 is positioned a relatively long distance away from this leg. This means that screw 46 will engage shaft 112 later than if the lower end of the screw were farther from leg 38 and that screw 44 will locate the starting position of tool mount 72 at a relatively high location.

Screw 44 is in engagement with lever 24 at all times while screw 46 is spaced from shaft 112 when cam 92 is in its starting position. Thus, as the cam rotates, region 96 will move away from lever 24 and region 98 will approach it. During this time, the lever will descend and cause member 32 to rotate in a counterclockwise sense about shaft 18 when viewing FIG. 1. This causes member 48 to pivot in a clockwise sense relative to member 32 inasmuch as spring 62 biases shaft 58 toward shaft 18. Rollers 60 therefore move along face 61 of plate 63 while shaft 64 is lowered to move collar 66 downwardly. This downward movement causes mount 70 to move from the uppermost dotted line position of FIG. 2 to the lower dashed line position representing the intermediate operative condition of tool mount 72.

Continued rotation of cam 92 will cause region 98 to move away from lever 24 and cause region 100 to approach it. During this time, lever 24 moves further downwardly and member 32 will follow it until screw 46 engages shaft 112. At this time, tool mount 72 will be in the full line position of FIG. 2.

Figure 4:
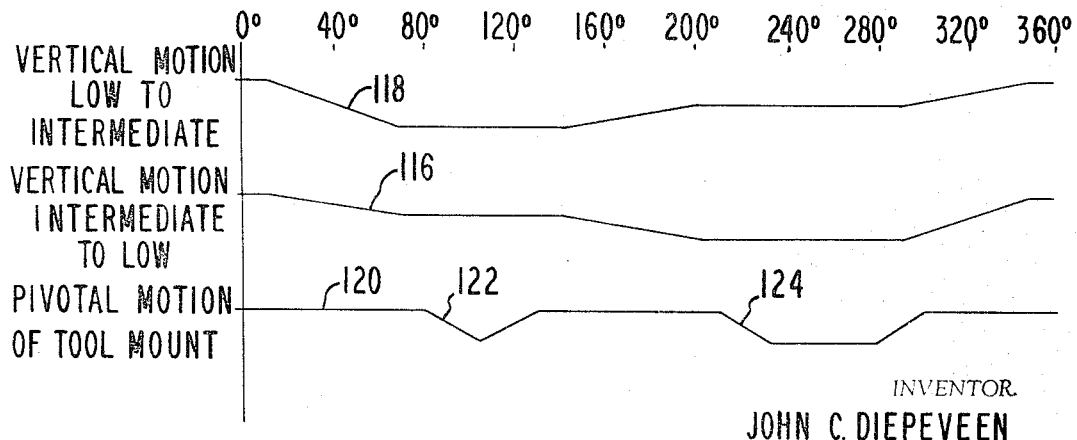
FIG. 4 is a graphic view of the motion of the tool mount for two different operating modes.

A cycle of rotation of cam 92 is shown graphically in FIG. 4 and is represented by the curve 116. It can be seen that the highest position of the tool mount occurs at the beginning and end of each cycle and that the intermediate position precedes the lowest position by a certain arcuate distance determined by the configuration of the cam.

Curve 118, shown above curve 116, is a plot of the movement of mount 74 when cam 90 is utilized. In this situation, the mount moves from the highest to the lowest position, then to the intermediate position and returns finally to the highest position.

Curve 120 represents the pivotal movement of the tool mount relative to shaft 64. This movement allows the weight of the mount to provide a force for tool 76 when it engages a workpiece. It is to be noted that the dips 122 and 124, corresponding to regions 104 and 106, occur during the times when tool mount 72 is in either its lowest position or its intermediate position. It is at these times when the force is to be applied since the tool will be properly positioned relative to the workpiece.

When it is desired to move the tool mount in the manner represented by curve 118, screws 44 and 46 are retracted so that they become inoperative. Screws 40 and 42 are then set to the proper positions, with screw 42 engaging lever 22 and screw 40 being spaced from shaft 110. Screw 40 determines the lowermost position of the lever while screw 42 determines the intermediate and highest position.

As cam 90 rotates, region 96 thereof will move away from lever 22 as region 100 approaches the same. During this time tool mount 72 will move from its highest position to its lowest position. Continued rotation of the cam will cause region 100 to move away from lever 22 and region 98 to approach it. As this occurs, the tool mount moves from its lowest position to its intermediate position. Finally, region 96 of cam 90 will again approach lever 22 to cause the latter to move upwardly and return the tool mount to its highest position.

Any suitable power source may be used to rotate shaft 88 and thereby the cams coupled therewith. As shown in FIG. 3, a timing belt and pulley assembly 120 is provided at one end of shaft 88, assembly 120 being coupled to any suitable prime mover such as an electric motor or the like.

One application of apparatus 10 is an ultrasonic bonding machine for moving the bonding tool toward and away from a workpiece to be bonded. To this end, support 12 will comprise a housing in which the movable cams and levers will be positioned, the housing to have a top 122 through which screws 40–46 extend. Thus, heads 114 will be accessible for adjustment purposes to permit the machine to switch from one of the operational modes of the tool mount to the other. Also, the housing will have a front opening 124 through which mount 72 may extend to conceal the remainder of the drive apparatus while providing a finished appearance for the machine.

In using the apparatus in this manner, a workpiece will be mounted in any suitable manner forwardly of the housing and below the tool mount. Conventionally, a workpiece is mounted on a post capable of being indexed according to a predetermined sequence.

Initially, tool mount 72 is leveled with respect to the workpiece so that tool 74 will be in the proper attitude as it is lowered to the workpiece. To this end, an extension 126 is eccentrically mounted on each end of shaft 20 respectively. The extensions are journaled in side walls 14 and 16 and one of the extensions can be manually rotated, such as by a suitable tool. When this occurs, shaft 20 moves horizontally along a path perpendicular to its axis. Thus, tool mount 72 is pivoted into the desired initial position. Extensions 126 are then located in place.

By actuating the power source connected to shaft 88, after having set the particular screws for the desired movement of the tool mount, the latter will move downwardly successively into operative position and then back to its starting position. In both of its operating positions, the tool will engage a workpiece such as a wire to be bonded to two locations. Thus, the wire could be bonded by sonic energy to one contact of a semiconductor wafer while the other end of the wire could be bonded to a terminal or post.

Generally, the wafer contacts and the terminal posts of a semiconductor assembly are at different elevations when the assembly is disposed below tool 74. The post is usually higher than the wafer and on some assemblies it is desirable to go first to the post and then to the wafer. For this situation, the tool is moved according to curve 116 of FIG. 4. For other assemblies it is desirable to go from the wafer to the post. In this case, the tool follows the movement of curve 118. The path of movement of the tool is, of course, established by adjusting screws 40, 42, 44 and 46 in the manner set forth above.

Drive apparatus 10 is suitable for a number of other uses as will be apparent to those skilled in the art. Its use is therefore not limited to a bonding machine of the type described.

While one embodiment of this invention has been shown and described, it will be apparent that other adaptations and modifications can be made without departing from the true spirit and scope of the invention.

What is claimed is:

1. In combination: a control member mounted for rotation about a first axis; an elongated actuating member mounted between its ends on said control member for rotation about a second axis parallel to said first axis; an abutment spaced from said axes, one end of said actuating member being in engagement with said abutment and movable along the same in response to the rotation of the actuating member on said control member; said activating member being rotatable in response to rotative movement of said control member; and drive means coupled with said control member for rotating the same in opposed directions, whereby structure coupled with the opposite end of said actuating member will be made to traverse a predetermined path defined by the ratio of the distances of respective ends of the actuating member from said second axis.

2. The combination as set forth in claim 1, wherein is provided means biasing said one end of said actuating member against said abutment.

3. The combination as set forth in claim 1, wherein said abutment has a face substantially parallel to said axes, said one end of said actuating member being in engagement with said face.

4. The combination as set forth in claim 1, wherein said axes are horizontal and said abutment is provided with a lower, horizontal face, said one end of said actuating member engaging said lower face, and wherein is provided a spring biasing said one end against said lower face.

5. The combination as set forth in claim 1, wherein is provided means for adjusting the initial position of said control member with respect to said drive means, whereby the distance traversed by said opposite end of said actuating member and thereby the length of said path can be changed.

6. The combination as set forth in claim 1, wherein said second axis is substantially equidistant between said ends of said actuating member.

7. The combination as set forth in claim 1, wherein said drive means includes a rotatable cam and pivoted lever assembly.

8. The combination as set forth in claim 1, wherein said drive means includes a rotatable shaft parallel to said axes, a cam secured to said shaft for rotation therewith, a lever pivotally mounted adjacent to one end thereof for rotation about said first axis, the opposite end of the lever being in engagement with said cam for pivotal movement thereby upon rotation of said shaft, and means coupling said control member to said lever for moving the control member in response to the movement of said lever.

9. The combination as set forth in claim 1, wherein said axes are horizontal, said drive means including a rotatable shaft parallel to said axes, a cam secured to said shaft for rotation therewith, a lever pivotally mounted adjacent to one end thereof for rotation about said first axis, the opposite end of the lever engaging and being supported by the upper portion of said cam, said control member having an outer extremity remote from said first axis and being above a part of the lever, and means carried by said outer extremity of the control member for engaging said lever to maintain a predetermined spacing between said outer extremity and said lever.

10. The combination as set forth in claim 1, wherein is provided a support having a lateral projection, said axes being horizontally disposed, said drive means including a horizontal shaft journalled on said support, a cam having an outer peripheral cam edge and secured to said shaft for rotation therewith, a lever pivotally mounted adjacent one end thereof on said support for rotation about said first axis, the opposite end of the lever engaging and being supported by said cam edge, said control member having an outer extremity remote from said first axis and disposed above a portion of said lever, a pair of screws threadably mounted in said outer extremity, one of the screws being in engagement with said projection on said support and the other screw being engageable with said lever.

11. The combination as set forth in claim 1, wherein is provided a support having a pair of spaced lateral projections, a first horizontal shaft defining said first axis, said drive means including a second horizontal shaft laterally spaced from said first shaft, a pair of spaced cams secured to said second shaft for rotation therewith, a lever for each cam respectively, each of the levers being rotatably mounted adjacent to one end thereof on said first shaft, the opposite end of each lever engaging and being supported by a respective cam, each cam having a continuous cam edge provided with a high region, an intermediate region, and a low region corresponding to high, intermediate and low operative positions of said control member, one of the cams having the intermediate region between the high and the low regions thereof and the other cam having the low region between the high and the intermediate regions thereof with respect to the direction of rotation of the cams, said control member being rotatably mounted on said first shaft and having a pair of legs extending in a direction away from said first shaft, each leg having a pair of screws threadably mounted thereon, one of the screws of each leg being engageable with a respective lateral projection on said support for stopping the downward movement of the control member to thereby define the low operative position of said control member, the other screw of each leg normally engaging the upper surface of the respective lever to thereby effect placement of said control member at its intermediate positions when the opposite ends of the lever engages the intermediate region of the respective cam, and means for rotating said second shaft according to a predetermined timed sequence.

12. The combination as set forth in claim 1, wherein is included utilitarian structure mounted on said opposite end of said actuating member for movement therewith.

13. The combination as set forth in claim 1, wherein said second axis is horizontally disposed, and wherein is provided a tool mount pivotally secured to said opposite end of said actuating member for rotation about a third axis parallel to said second axis, said tool mount having a vertical leg, and a second abutment mounted for movement relative to said actuating member and normally engaging said leg to prevent relative movement between said tool mount and said actuating member, and means coupled with said second abtutment for shifting the same to permit said relative movement when said actuating member is in a predetermined operative position.

14. The combination as set forth in claim 1, wherein said axes are horizontally disposed, said drive means including a rotatable shaft parallel to said axes, a first cam secured to the shaft for rotation therewith, and a first lever coupling the control member to said cam whereby the control member pivots about said first axis in response to the rotation of said cam, and including a tool mount pivotally coupled to said opposite end of said actuating member and having a depending leg, a second lever pivotally mounted adjacent to one end thereof for rotation about a third axis parallel to said first and second axes, a second cam mounted on said shaft for rotation therewith and having a low region and a high region, the opposite end of said second lever engaging said second cam, said one end of said second lever having an ear engaging said leg of said tool mount and being rotatable with said second lever about said third axis when said opposite end of said second lever moves from said high region to said low region of said second cam, whereby said tool mount will pivot relative to said actuating member.

15. In combination: a support having a pair of spaced side walls, each side wall having an inwardly extending projection; a first shaft secured to and spanning the distance between said side walls; a control member pivotally mounted on said first shaft and having a pair of generally parallel legs extending in a direction away from said first shaft, each of said legs having a pair of screws threadably mounted thereon and extending therethrough; an actuating member having a pair of elongated, inclined sides disposed partially between said legs of said control member, each of said sides having bearing means midway between its ends for pivotally connecting the side to a corresponding leg of said control member with the axis of each bearing means being horizontally disposed; a flat plate secured to said support and having a lower face; roller means on the upper ends of said sides for rollably engaging said lower face of said plate; a spring interconnecting said roller means and said control member to bear said roller means against said lower face; a tool mount; means pivotally mounting said tool mount on the lower ends of said sides with the tool mount extending outwardly thereof, said tool mount having a depending leg; first and second levers pivotally mounted on said first shaft and extending in a direction away from said tool mount, said levers having upper surfaces below respective legs of said control member and being adjacent to respective lateral projections on said support; a second shaft journalled on said support spanning the distance between said side walls; first and second cams secured to said second shaft for rotation therewith and having respective cam edges, each cam edge being continuous and provided with a high region, an intermediate region and a low region corresponding to high, intermediate and low operative dispositions of said control member, the intermediate region of one of the cams being between the high and the intermediate regions thereof with respect to the direction of rotation of said second shaft, the outer ends of said first and second levers having rollers in engagement with and being supported by respective first and second cam edges, whereby said first and second levers are pivoted about said first shaft in response to the rotation of said second shaft, one screw of each leg of said control member being engageable with a respective lateral projection to stop the downward movement of the control member when the roller on the outer end of the respective lever engages the low region of the corresponding cam to thereby establish the low operative disposition of said control member, the other screw of each leg normally engaging the upper surface of the respective lever to thereby effect placement of said control member at its intermediate position when the roller at its outer end of the respective lever engages the intermediate region of the corresponding cam; a third lever pivotally mounted on said support for movement about an axis parallel to said shafts, said third lever having an ear adjacent to one end thereof, said ear engaging said depending leg of said tool mount for preventing relative movement between said tool mount and said sides when the third lever is in a first position, said third lever being movable to a second position permitting said relative movement, whereby said tool mount may pivot relative to the lower ends of said sides; a third cam on said second shaft and having a cam edge provided with a high region and a low region, said third lever having an outer end provided with a roller engaging said cam edge, said third lever being movable from said first position to said second position as said roller moves relative to said third cam from said high region to said low region thereof; and means coupled with said shaft for rotating the same in accordance with a predetermined timed sequence.

References Cited
UNITED STATES PATENTS 3,305,157   2/1967   Pennings _____ 228—7

JOHN F. CAMPBELL, *Primary Examiner.*

M. L. FAIGUS, *Assistant Examiner.*

UNITED STATES PATENT OFFICE
CERTIFICATE OF CORRECTION

Patent No. 3,342,395

September 19, 1967

John C. Diepeveen

It is hereby certified that error appears in the above numbered patent requiring correction and that the said Letters Patent should read as corrected below.

Column 1, line 40, after "also in" insert -- the way --; column 3, line 70, for "maunt" read -- mount --; column 4, line 37, after "arm" insert -- 22 --; same line 37, for "thererore" read -- therefore --; column 5, line 10, strike out "and the highest position"; line 12, after "position" insert -- and the highest position --; line 55, for "74" read -- 72 --; column 8, line 45, for "abtutment" read -- abutment --.

Signed and sealed this 22nd day of October 1968.

(SEAL)
Attest:

Edward M. Fletcher, Jr.
Attesting Officer

EDWARD J. BRENNER
Commissioner of Patents